United States Patent [19]

Kishi et al.

[11] Patent Number: 4,535,433
[45] Date of Patent: Aug. 13, 1985

[54] APPARATUS FOR PLAYING BACK ROTATING RECORDING MEDIUMS

[75] Inventors: Toru Kishi, Zama; Takashi Saito, Ayase, both of Japan

[73] Assignee: Victor Company of Japan, Ltd., Japan

[21] Appl. No.: 571,653

[22] Filed: Jan. 17, 1984

[30] Foreign Application Priority Data

Jan. 18, 1983 [JP] Japan .................................. 58-6016

[51] Int. Cl.$^3$ ........................ G11B 17/04; G11B 1/00
[52] U.S. Cl. .................................................. 369/77.2
[58] Field of Search ........................ 369/77.2; 360/133

[56] References Cited

U.S. PATENT DOCUMENTS 4,410,972 10/1983 Saito et al. ........................ 369/77.2
4,443,872 4/1984 Kirschner ........................ 369/77.2

FOREIGN PATENT DOCUMENTS 2087128 5/1982 United Kingdom .............. 369/77.2

Primary Examiner—Steven L. Stephan
Attorney, Agent, or Firm—Lowe, King, Price & Becker

[57] ABSTRACT

A rotating recording medium such as a video disc placed on a turntable is played back by a signal pickup head movable radially over and across the disc. The disc is removably housed in a disc case composed of a jacket for containing the disc and a lid plate closing a slot in the jacket. When the disc case is inserted, it pushes a jacket opener over and across the turntable while the slot is opened by the jacket opener for removal of the disc. When the disc playback apparatus is not in operation or the disc is being played back, the jacket opener is firmly locked by a locking mechanism against movement into the apparatus, so that forced entry of a disc case into the apparatus is prevented. Since the jacket opener is locked at laterally spaced positions by the locking mechanism, the jacket opener is rigidly kept in the locked position against the operator's undue attempts to insert the disc case.

8 Claims, 9 Drawing Figures

APPARATUS FOR PLAYING BACK ROTATING RECORDING MEDIUMS

BACKGROUND OF THE INVENTION

The present invention relates to an apparatus for playing back rotating recording mediums such for example as video discs, PCM audio discs, or the like, and more particularly to a device in such an apparatus for preventing a container case for the rotating recording medium from being erroneously inserted into the apparatus.

Known apparatus for playing back rotating recording mediums of the kinds described above (hereinafter referred to as a "disc") generally have a signal pickup head disposed over a turntable and movable radially across the disc placed on the turntable to reproduce signals recorded on the disc while the latter rotates at a high speed. According to one type of such disc playback apparatus, a jacket containing a disc is inserted into the apparatus to place the disc therein for reproducing the signals stored in the disc. When the disc is inserted, it is initially held over the turntable. When the disc is to be removed out of the apparatus, the disc is again supported over the turntable and a disc case or empty jacket is inserted into the apparatus while a disc support by which the disc is centrally supported is in a raised position, for thereby placing the disc into the disc case for removal. To prevent the disc case or jacket from being inserted in error, a jacket opening mechanism or jacket opener in the apparatus is locked to block the disc case or jacket against insertion while an attempt is being made to place the disc case into the apparatus when the disc support is in the lifted position, that is, when the power is turned off and the apparatus is in a disc playback mode.

The conventional jacket opener is locked by a locking mechanism at one side thereof only. When the disc case is forcibly pushed on, therefore, one side of the disc case tends to be forced in though the other side is locked by the locking mechanism. The disc case thus inserted is caused to swing laterally, or is blocked resiliently rather than rigidly, so that the operator does not feel any secure reaction indicative of the locked condition of the jacket opener. As a result, the operator tends to force the disc case into the apparatus when the jacket opener is actually locked and the disc case should not be inserted. Another problem is that the locking mechanism lacks a desired degree of mechanical strength.

SUMMARY OF THE INVENTION

It is an object of the present invention to provide an apparatus for playing back rotating recording mediums which has a jacket opener locking mechanism for securely and rigidly locking a jacket opener in a disc case insertion slot against forced entry of a disc case into the apparatus.

According to the present invention, there is provided an apparatus for playing back a rotating recording medium removably housed in a case including a jacket for containing the rotating recording medium and a lid plate closing a slot in the jacket, the apparatus comprising a turntable for placing the rotating recording medium thereon, a signal pickup head for reproducing signals recorded on the rotating recording medium on the turntable, means including a support movable selectively into an elevated position for supporting the rotating recording medium above the turntable and into a lowered position for placing the rotating recording medium on the turntable, a jacket opener movable over and across the turntable in response to being pushed by the case when the case is inserted into a position over the turntable, for opening the slot in the jacket, and a locking mechanism responsive to operation of the means for locking the jacket opener at laterally spaced positions thereon against movement over and across the turntable when the support is in the lowered position.

With this arrangement, when the operator attempts to insert the case in error while the jacket opener is locked by the locking mechanism, that is, the apparatus is not ready for receiving a rotating recording medium, the case hits the locked jacket opener, and the operator can feel a firm reaction through his hand, the reaction being representative of the case being rigidly rejected by the jacket opener at its laterally spaced positions. Therefore, the operator will not forcibly insert the case, and no erroneous case insertion is effected. Since the jacket opener is locked at its laterally spaced positions by the locking mechanism, the jacket opener is of an increased mechanical strength when in the locked position and hence is highly reliable in operation. The jacket opener has a pair of beams for opening the slot in the jacket, and one of the beams is positively locked by the locking mechanism. This allows the operator to have a definite reaction when the case hits the jacket opener, so that the operator can cease his efforts to insert the case without fail.

BRIEF DESCRIPTION OF THE DRAWINGS

The present invention will be described in detail by way of illustrative example with reference to the accompanying drawings, in which.

DETAILED DESCRIPTION

Figure 1:
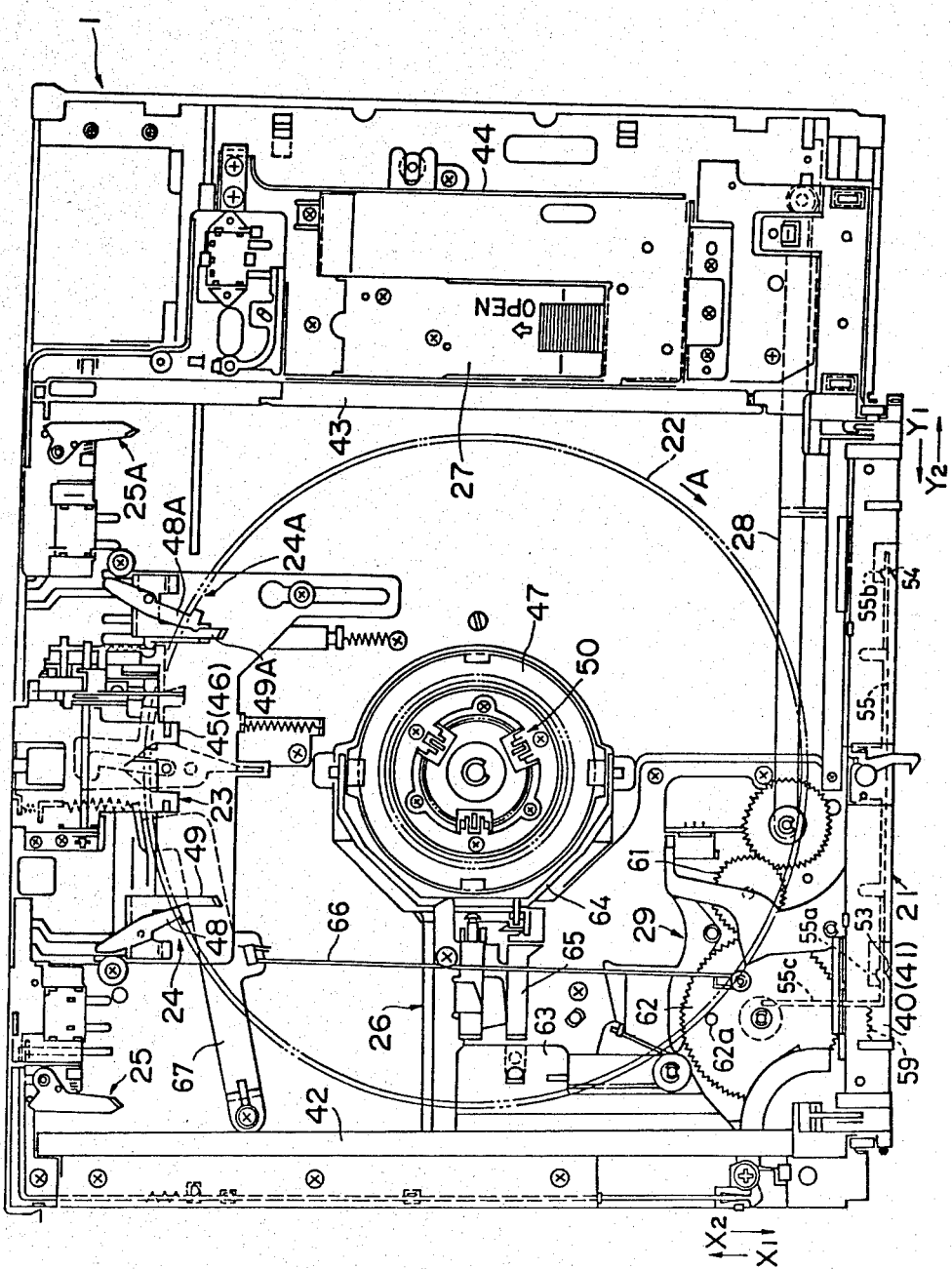
FIG. 1 is a plan view of a disc playback apparatus according to the present invention, with a top cover omitted from illustration, prior to the insertion of a disc.

FIG. 1 shows a disc playback apparatus, generally designated by the reference character 1, according to the present invention, for playing back a disc 3 (FIG. 2), which is contained in a disc case 2 when not in use.

Figure 2:
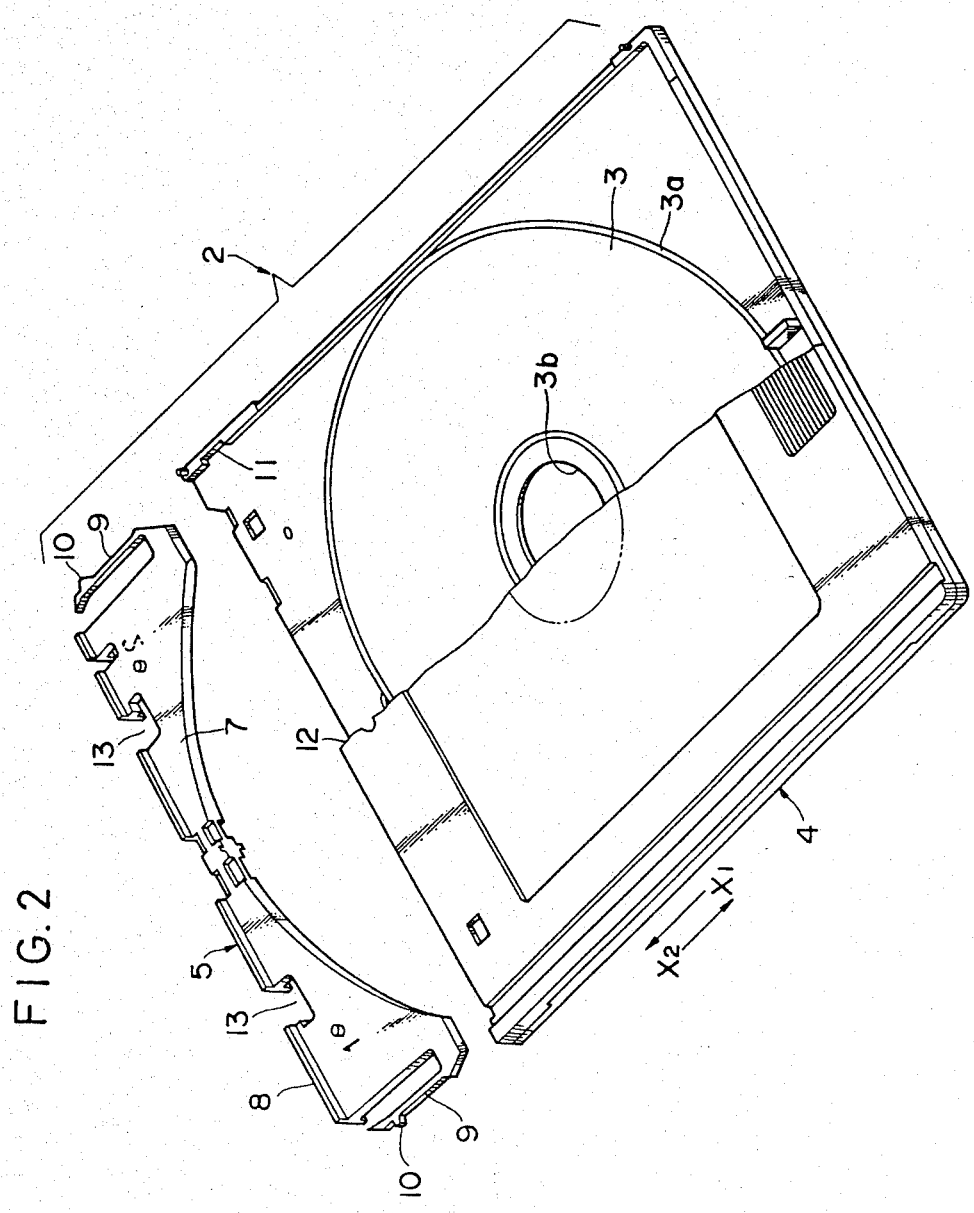
FIG. 2 is a fragmentary exploded perspective view of a disc case for use in the disc playback apparatus shown in FIG. 1.

As illustrated in FIG. 2, the disc case 2 is basically composed of a jacket 4 and a lid plate 5 mounted therein. The disc 3 is accommodated in a flat space defined in the jacket 4. The lid plate 5 comprises a body 7, a flange 8 on a front edge of the body 7, and a pair of engaging arms 9 on side edges of the body 7, the engaging arms 9 having locking projections 10, respectively. When the lid plate 5 is disposed in the jacket 4, the locking projections 10 of the engaging arms 9 engage respectively in recesses 11 defined in opposite inner side walls of the jacket 4 with the flange 8 closing an opening or slot 12 in the jacket 4.

As shown in FIG. 1, the disc playback apparatus 1 generally includes a jacket opening mechanism (hereinafter referred to as a "jacket opener") 21 normally positioned in a disc case insertion slot in the apparatus 1, a turntable 22 for placing and rotating the disc 3 thereon, a disc clamp mechanism 23 for clamping the disc 3, lid plate holding mechanisms 24, 24A for holding the lid plate 5 when the disc 3 is to be mounted on the turntable 22 and releasing the lid plate 5 when the disc 3 is to be removed from the apparatus 1, lid plate releasing mechanisms 25, 25A for releasing the lid plate 5 from the jacket 4 when the disc case 2 is inserted deeply into the apparatus 1, a disc lifting and lowering mechanism 26 for lifting and lowering the disc 3 over the turntable 22, a signal pickup head moving mechanism 28 for moving a signal pickup head 27 in the directions of the arrows Y1, Y2 radially of the disc 3 placed on the turntable 22, and a control mechanism 29 for selectively actuating the disc lifting and lowering mechanism 26 and the signal pickup head moving mechanism 28.

The jacket opener 21 has a pair of upper and lower beams 40, 41 for opening the slot 12 in the jacket 4 and is movable across and over the turntable 22 in the directions of the arrows X1, X2 with opposite ends of the beams 40, 41 guided by a pair of guide rails 42, 43. The signal pickup head 27 is mounted on a carrier 44 movable in the directions of the arrows Y1, Y2. The disc clamp mechanism 23 is disposed back in the apparatus 1 and has a pair of upper and lower clamp fingers 45, 46.

For playing back the disc 3, a standby button (not shown) is depressed, and the disc case 2 is inserted into the apparatus 1. In response to the actuation of the standby button, the control mechanism 29 is actuated to cause the disc lifting and lowering mechanism 26 to raise a disc support 47, and the disc clamp mechanism 23 is brought into a condition ready for clamping the disc 3.

When the disc case 2 is inserted into the apparatus 1 in the direction of the arrow X1, the slot 12 in the jacket 4 is vertically forced open by the jacket opener 21 as the latter is pushed into the apparatus 1. In response to full insertion of the disc case 2 deeply into the apparatus 1, the disc clamp mechanism 23 is operated to enable the clamp fingers 45, 46 to clamp a groove guard 3a (FIG. 2) of the disc 3, and the lid plate holding mechanisms 24, 24A are operated to cause locking fingers 48, 48A thereof to enter L-shaped recesses 13 in the lid plate 5 and then to turn into engagement with the lid plate 5. The lid plate 5 is now engaged by the locking fingers 48, 48A and placed on support fingers 49, 49A respectively of the mechanisms 24, 24A. Therefore, the lid plate 5 is locked in the apparatus 1. At the same time, the lid plate releasing mechanisms 25, 25A are actuated to release the lid plate 5 from the jacket 4.

When the disc case 2 is thereafter pulled in the direction of the arrow X2, only the jacket 4 is removed out of the apparatus 1 while leaving the lid plate 5 and the disc 3 therein. At this time, the jacket opener 21 is also moved back in the direction of the arrow X2. The disc 3 is horizontally supported directly above the turntable 22 by the disc support 47 as elevated on a peripheral edge around a central hole 3b in the disc 3 with the groove guard 3a clamped by the disc clamp mechanism 23.

On removal of the jacket 4 out of the apparatus 1, the disc clamp mechanism 23 releases the disc 3 and the disc support 47 is lowered to allow the disc 3 to be placed on the turntable 22, whereupon the peripheral edge around the central hole 3b in the disc 3 is clamped by a clamp finger mechanism 50 on the turntable 22. The turntable 22 is now rotated by a turntable motor (not shown) to rotate the disc 3 thereon clockwise (FIG. 1) in the direction of the arrow A.

The carrier 44 is then moved in the direction of the arrow Y1 to have the signal pickup head 27 relatively scan the signal recording surface of the disc 3 for thereby reproducing information signals.

The disc 3 can be removed from the apparatus 1 and retrieved into the disc case 2 in the following manner: After the disc 3 is played back or the playback mode is interrupted, the carrier 44 with the signal pickup head 27 thereon is moved in the direction of the arrow Y2 back to the original position, and the disc support 47 is raised to lift the disc 3 which is then clamped by the disc clamp mechanism 23.

The empty jacket 4 is inserted again into the apparatus 1 with the slot 12 positioned ahead. The jacket opener 21 is pushed again by the jacket 4 in the direction of the arrow X1 while opening the slot 12 in the jacket 4. The insertion of the jacket 4 in the direction of the arrow X1 causes the disc 3 to be inserted into the jacket 4 through the slot 12. When the jacket 4 is fully inserted into the apparatus 1, the disc 3 is stored in the jacket 4, and the lid plate 5 enters the jacket 4, closing the slot 12. The lid plate 5 is separated from the lid plate releasing mechanisms 25, 25A and locked in the jacket 4. By then pulling the jacket 4 in the direction of the arrow X2, the jacket 4 with the lid plate 5 coupled thereto is moved in the direction of the arrow X2 and hence the disc 3 is removed from the apparatus 1 and stored back into the disc case 2.

A jacket opener locking mechanism according to the present invention will now be described with reference to FIGS. 3 through 9.

Figure 3:
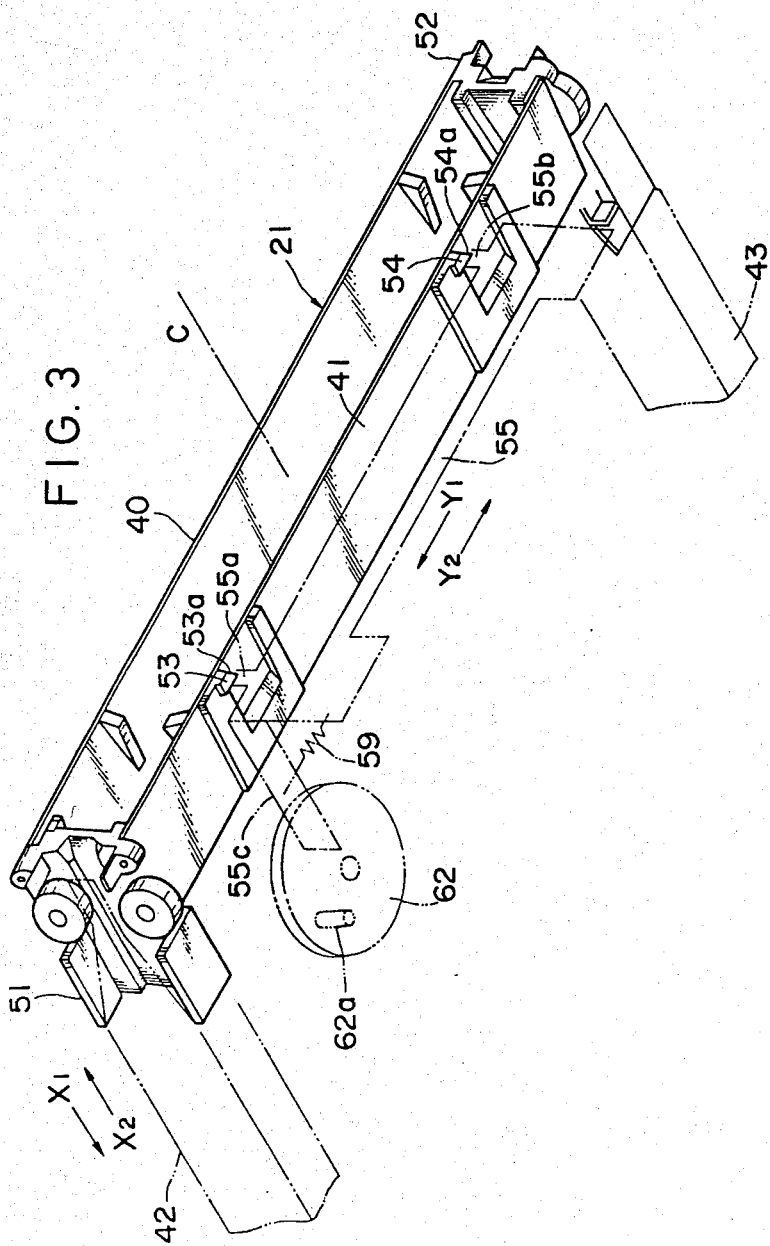
FIG. 3 is an enlarged perspective view, as seen from below, of a jacket opener along with a locking plate.
Figure 4:
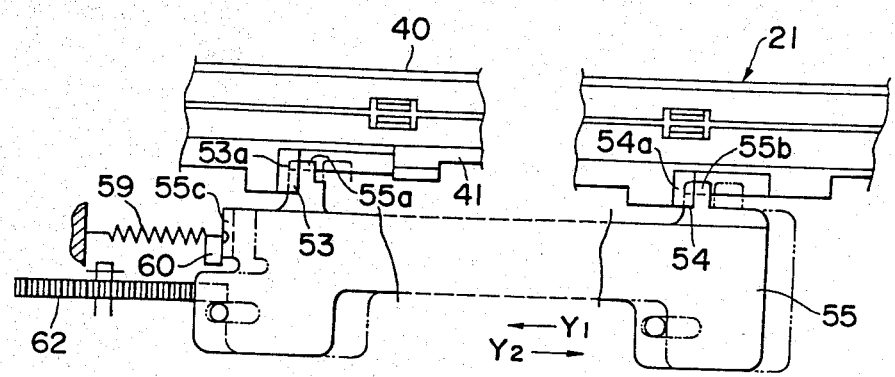
FIG. 4 is a front elevational view of the jacket opener locked by the locking plate.
Figure 5:
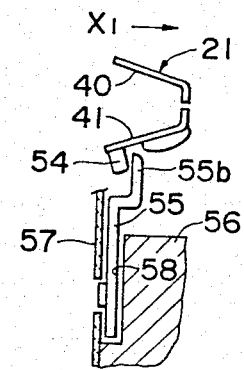
FIG. 5 is a side elevational view of the jacket opener locked by the locking plate.

As illustrated in FIGS. 3 through 5, the upper and lower beams 40, 41 of the jacket opener 21 are of a narrow elongate configuration and extend in the directions of the arrows Y1, Y2. The jacket opener 21 also includes a pair of sliders 51, 52 movably fitted over the guide rails 42, 43, respectively, the beams 40, 41 being angularly movably supported at opposite ends thereof on the sliders 51, 52. The lower beam 41 has on its lower surface a pair of ledges or projections 53, 54 for coacting with a locking plate 55 (described later on). The ledges or projections 53, 54 are positioned in substantially central positions in righthand and lefthand halves of the beam 41 and are symmetrical with respect to a central line C (FIG. 3) along which the disc case 2 can be inserted into the apparatus 1. The ledges or projections 53, 54 have slanted front surfaces 53a, 54a, respectively, for causing easy and smooth displacement of the locking plate 55 upon engagement therewith.

Figure 6:
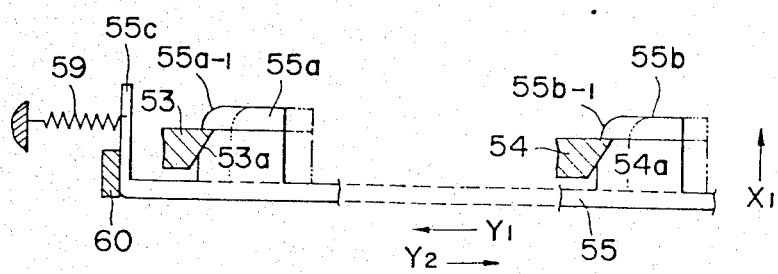
FIG. 6 is an enlarged plan view of the locking plate with locking fingers thereof held in locking engagement with ledges, respectively, of the jacket opener.

The locking plate 55 is disposed below the jacket opener 21 and fitted in a narrow deep slot 58 (FIG. 5) defined between a chassis 56 and a front bracket 57 of the apparatus 1, the locking plate 55 being movable in the slot 58 in the directions of the arrows Y1, Y2. The locking plate 55 has a pair of upwardly projecting locking fingers 55a, 55b spaced from each other by a distance substantially equal to that by which the ledges 53, 54 are spaced from each other. The locking fingers 55a, 55b have round rear surfaces 55a-1, 55b-1, respectively, as shown in FIG. 6, which face the interior of the apparatus 1 for sliding engagement with the respective slanted front surfaces 53a, 54a of the ledges 53, 54. (The terms "front" and "rear" are used herein with reference to the direction in which the panel of the apparatus having the disc case insertion slot is regarded as a front panel.) The locking plate 55 is normally urged by a coil spring 59 to move in the direction of the arrow Y2 into a locked position in which the locking plate 55 is engaged at an end thereof by a stop 60.

Prior to insertion of the disc 3 and when the power supply for the apparatus 1 is turned off, the locking plate 55 is in the locked position in which the locking fingers 55a, 55b are positioned behind the respective ledges 53, 54, as shown in FIGS. 3, 4 and 6. When the disc case 2 is inserted under this condition, the jacket opener 21 is forced by the disc case 2 to move in the direction of the arrow X1. However, since the ledges 53, 54 are engaged by the locking fingers 55a, 55b, respectively, the jacket opener 21 is locked at its laterally spaced positions against movement into the apparatus 1, so that the disc case 3 will be prevented from being inserted.

Since the jacket opener 21 is engaged and locked at the two spaced positions on the lower beam 41 thereof, rather than at the sliders 51, 52, the jacket opener 21 is firmly locked in position without suffering from any unwanted wobbling movement. At this time, the operator who attempts to insert the disc case 3 feels a firm reaction through his hand, indicating the disc case 2 being stopped rigidly, rather than resiliently. Therefore, the operator can immediately realize that he is attempting to insert the disc case 2 in error and should not continue to forcibly insert the disc case 2, instead of misunderstanding that the disc case 2 gets caught by something in the apparatus 1 and could be inserted if forcibly pushed on. The jacket opener locking mechanism of the above construction can accordingly enables the operator reliably to stop or cease any undue insertion of the disc case 2 into the apparatus 1.

When a standby button (not shown) is depressed, the power supply for the apparatus 1 is turned on to start a motor (not shown) for causing a driver gear 61 (FIG. 1) to rotate a main gear 62 counterclockwise through about ⅔ of one revolution. The rotation of the main gear 62 then causes a control arm 63 to turn counterclockwise, whereupon a lifter arm 64 is pulled by a link 65 to raise the disc support 47 above the turntable 22. At the same time, the rotation of the main gear 62 pulls a rod 66 to turn a pull lever 67 for readying the disc clamp mechanism 23 for clamping the disc 3. The internal mechanisms in the apparatus 1 can now receive the disc 3 inserted.

When the main gear 62 is rotated as described above, a pin 62a mounted thereon pushes an arm 55c of the locking plate 55 to displace the latter in the direction of the arrow Y2 against the bias of the coil spring 59. The arm 55c is continuously pushed by the pin 62a until the locking plate 55 reaches an unlocked position, shown by the two-dot-and-dash lines in FIGS. 4 and 6, in which the locking fingers 55a, 55b are laterally shifted out of engagement with the ledges 53, 54, respectively, and the jacket opener 21 is unlocked.

Thereafter, the disc case 2 is inserted and the jacket opener 21 is pushed thereby to move normally in the direction of the arrow X1. As the disc case 2 is then pulled outwardly, the jacket opener 21 is moved back in the direction of the arrow X2 to the position of the disc case insertion slot. When the disc case 2 is completely pulled out of the apparatus 1, the main gear 62 is automatically turned back clockwise under a spring force, causing the disc clamp mechanism 23 to release the disc 3 and the disc support 47 to descend for placing the disc 3 onto the turntable 22 for signal reproduction.

When the main gear 62 is turned back as described above, the pin 62a is disengaged from the arm 55c, and the locking plate 55 is permitted to move back in the direction of the arrow Y1 under the force of the spring 59 into the locked position in which the locking fingers 55a, 55b engage the ledges 53, 54, respectively, as illustrated in FIGS. 4 and 6. The jacket opener 21 is locked again securely by the locking plate 55 through the interengagement between the locking fingers 55a, 55b and the ledges 53, 54 in the same manner as when the power supply remains turned off. Any attempts by the operator to insert the disc case 2 into the apparatus 1 while the disc 3 is being played back are therefore prevented when the disc case 2 is securely rejected by the jacket opener 21 which is in firm engagement with the locking plate 55 at the time.

After the disc 3 has been played back, the disc 3 is supported by the disc support 47 and brought thereby above the turntable 22. Then, the locking plate 55 is moved in the direction of the arrow Y2 to unlock the jacket opener 21, whereupon the disc 3 can uninterruptedly be retrieved from the apparatus 1.

There are instances where the locking plate 55 happens to return to the locking position when the jacket opener 21 is positioned back in the apparatus 1 for disc insertion or retrieval. However, the jacket opener 21 can properly be moved back to the original position and locked by the locking plate 55 thus positioned, as will be described with reference to FIGS. 7 through 9.

Figure 7:
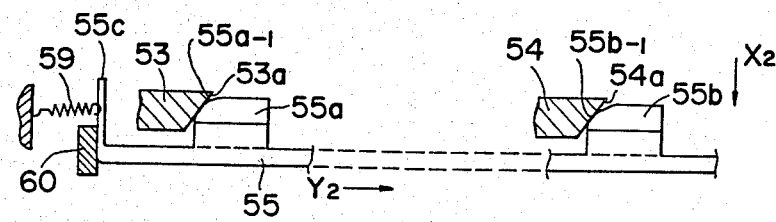
FIGS. 7, 8, and 9 are enlarged plan views showing the manner in which the jacket opener returns to the position of a disc case insertion slot while pushing back the locking plate out of the locking position and then is locked by the locking plate with the ledges engaged by the locking fingers.
Figure 8:
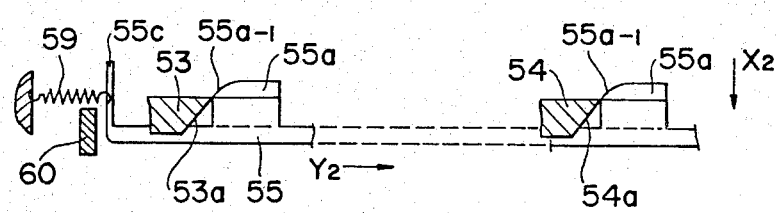
Figure 9:
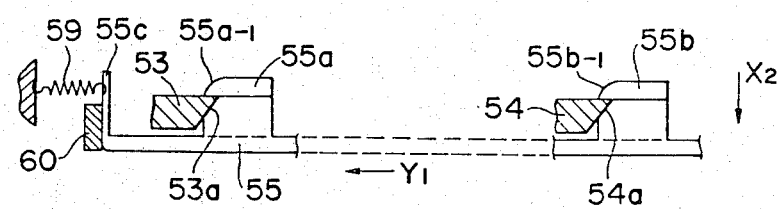

When the power supply is accidentally turned off in the process of inserting or retrieving the disc 3, the locking plate 55 is moved back to the locking position, and positioned in the way of returning movement of the jacket opener 21 from inside the apparatus 1. However, when the jacket opener 21 is moved in the direction of the arrow X2 to a position near the disc case insertion slot, the slanted front surfaces 53a, 54a of the ledges 53, 54 hit the round rear surfaces 55a-1, 55b-1 of the locking fingers 55a, 55b, as shown in FIG. 7. The continued returning movement of the jacket opener 21 causes the slanted front surfaces 53a, 54a to push the round rear surfaces 55a-1, 55b-1 laterally out of the way of the ledges 53, 54 in the direction of the arrow Y2, as illustrated in FIG. 8. After the ledges 53, 54 have moved past the locking fingers 55a, 55b, the locking plate 55 is moved back in the direction of the arrow Y1 under the force of the spring 59, as shown in FIG. 9, whereupon the ledges 53, 54 are engaged by the locking fingers 55a, 55b, respectively. The jacket opener 21 is now returned to the position of the disc case insertion slot, and locked in position by the locking plate 55.

Although a certain preferred embodiment of the present invention has been shown and described in detail, it should be understood that various changes and modifications may be made therein without departing from the scope of the appended claims.

What is claimed is:

1. An apparatus for playing back a rotating recording medium removably housed in a case including a jacket for containing the rotating recording medium and a lid plate closing a slot in the jacket, said apparatus comprising:
- (a) turntable for placing the rotating recording medium thereon;
- (b) a signal pickup head for reproducing signals recorded on the rotating recording medium on said turntable;
- (c) means including a support movable selectively into an elevated position for supporting the rotating recording medium above said turntable and into a lowered position for placing the rotating recording medium on said turntable;
- (d) a jacket opener movable over and across said turntable in response to being pushed by the case when the case is inserted into a position over said turntable, said jacket opener comprising a pair of beams for opening the slot in the jacket, one of said beams having a pair of ledges spaced from each other; and
- (e) locking means responsive to operation of said means for supporting, for locking said jacket opener at laterally spaced positions thereon against movement over and across said turntable when said support is in said lowered position, said locking mechanism comprising a locking plate having a pair of locking fingers spaced from each other for lockingly engaging said ledges, respectively.

2. An apparatus according to claim 1, wherein said jacket opener comprises a pair of guide rails, and a pair of sliders movably supported respectively by said guide rails and pivotably engageable by said locking mechanism for locking said jacket opener.

3. An apparatus according to claim 1, wherein said laterally spaced positions correspond to substantially central positions, respectively, of halves of said jacket opener.

4. An apparatus according to claim 2, wherein said locking mechanism further includes a spring for normally biasing said locking plate to keep said locking fingers in locking engagement with said ledges, respectively, said means for supporting including a motor-driven gear operatively coupled to said support and having a pin for pushing said locking plate against the resiliency of said spring to bring said locking fingers out of locking engagement with said ledges when said support is in said elevated position.

5. An apparatus according to claim 2, wherein said ledges have slanted surfaces, respectively, and said locking fingers having round surfaces, respectively, slidably engageable with said slanted surfaces before said ledges are locked by said locking fingers, respectively.

6. An apparatus, for playing back a rotating recording medium removably housed in a case including a jacket for containing the rotating recording medium and a lid plate closing a slot in the jacket, said apparatus comprising:
- (a) turntable for placing the rotating recording medium thereon;
- (b) a signal pickup head for reproducing signals recorded on the rotating recording medium on said turntable;
- (c) means including a support movable selectively into an elevated position for supporting the rotating recording medium above said turntable and into a lowered position for placing the rotating recording medium on said turntable;
- (d) a jacket opener movable over and across said turntable in response to being pushed by the case when the case is inserted into a position over said turntable, for opening the slot in the jacket and
- (e) a locking mechanism responsive to operation of said means for supporting, for locking said jacket opener at laterally spaced positions thereon against movement over and across said turntable when said support is in said lowered position, said jacket opener comprising a pair of beams for opening the slot in the jacket, a pair of guide rails, and a pair of sliders movably supported respectively by said guide rails and pivotably supporting ends of said beams, one of said beams being engageable by said locking mechanism for locking said jacket opener, wherein said one of the beams has a pair of ledges spaced from each other, said locking mechanism comprising a locking plate having a pair of locking fingers spaced from each other for lockingly engaging said ledges, respectively.

7. An apparatus according to claim 6, wherein said locking mechanism further includes a spring for normally biasing said locking plate to keep said locking fingers in locking engagement with said ledges, respectively, said means for supporting including a motor-driven gear operatively coupled to said support and having a pin for pushing said locking plate against the resiliency of said spring to bring said locking fingers out of locking engagement with said ledges when said support is in said elevated position.

8. An apparatus according to claim 6, wherein said ledges have slanted surfaces, respectively, and said locking fingers have round surfaces, respectively, slidably engageable with said slanted surfaces before said ledges are locked by said locking fingers, respectively.

* * * * *